(12) United States Patent
Wils et al.

(10) Patent No.: US 6,754,173 B2
(45) Date of Patent: *Jun. 22, 2004

(54) TRUNK ARRANGEMENT IN A COMPUTER NETWORK WITH INTRA TRUNK SWITCH CONNECTIONS

(75) Inventors: Joris Johannes Maria Wils, Acton, MA (US); James Scott Hiscock, Rockport, MA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/452,648

(22) Filed: Jun. 2, 2003

(65) Prior Publication Data

US 2003/0198222 A1 Oct. 23, 2003

Related U.S. Application Data

(63) Continuation of application No. 09/232,105, filed on Jan. 15, 1999, now Pat. No. 6,608,812.

(51) Int. Cl.⁷ .................... G01R 31/08; G06F 11/00; G08C 15/00; H04J 1/16; H04J 3/14; H04L 1/00; H04L 12/26; H04L 12/28; H04L 12/56

(52) U.S. Cl. ...................................... 370/217; 370/389

(58) Field of Search ................................ 370/216–217, 370/225–228, 389, 400, 401, 419, 420, 463

(56) References Cited

U.S. PATENT DOCUMENTS

| 6,088,330 A | * | 7/2000 | Bruck et al. ................. 370/228 |
| 6,195,351 B1 | * | 2/2001 | Hiscock et al. ............. 370/389 |
| 6,608,812 B1 | * | 8/2003 | Wils et al. .................... 370/217 |

* cited by examiner

*Primary Examiner*—Seema S. Rao
*Assistant Examiner*—Kevin C. Harper
(74) *Attorney, Agent, or Firm*—McGlew and Tuttle, P.C.

(57) ABSTRACT

A trunk switch of a trunk cluster for connecting a plurality of edge devices to each other, where each edge device can communicate with all the other edge devices through all of the trunk switches. Each trunk switch contains an intra cluster port and intra cluster links connect the intra cluster ports of different trunk switches. When an edge device becomes disconnected from one trunk switch, but is still connected to another trunk switch, the trunk switch from which it has become disconnected transfers the data destined for the disconnected edge device to the intra cluster port which then transfers that data to another trunk switch. The another trunk switch, upon receiving the intra cluster data, then forwards that data to the edge device which has become disconnected from the first trunk switch.

18 Claims, 5 Drawing Sheets

TRUNK ARRANGEMENT IN A COMPUTER NETWORK WITH INTRA TRUNK SWITCH CONNECTIONS

This is a Continuation of application Ser. No. 09/232,105 now U.S. Pat. No. 6,608,812, filed Jan. 15, 1999, and the entire disclosure of this prior application is considered to be part of the disclosure of the accompanying application and is hereby incorporated by reference therein.

FIELD OF THE INVENTION

The present invention relates to connecting a plurality of edge devices to each other over a plurality of lines, and in particular through a plurality of trunk switches where the trunk switches have a high speed connection between them.

BACKGROUND OF THE INVENTION

In a computer network, devices communicate with each other over links. The amount of information or data that can be transmitted over a link, is limited by the bandwidth of the link. Different types of links, such as twisted pair, shielded twisted pair, coaxial and fiber-optic, have different amounts of bandwidth. Generally the larger the bandwidth of a link, the more expensive the cost per length of the link, and the difficulty in using the link. Presently, the rate at which information or data is desired between devices is much higher than the bandwidth of existing links, or economically practical links. Furthermore, it is foreseen that the desired data rates will constantly and significantly increase, while increasing the bandwidth of a link is seen to be much more difficult in the future.

One possibility for increasing the data rate between two devices is to use a plurality of links. This is especially beneficial in computer networks where the information to be transported is divided into a plurality of packets. The packets are then divided over the plurality of links and the data rate of the connection is substantially the sum of the data rate that each link can transfer.

The plurality of combined links are known as trunked lines or links. Trunked lines or links are useful when two separate devices need to communicate directly with each other at high data rates.

However, if three or more devices, and possibly tens or hundreds of devices, desire, or require, a high data rate connection, the use of a plurality of trunk lines by themselves would not be particularly effective.

Applicant's U.S. Pat. Nos. 6,195,351 B1, 6,195,349 B1, 6,058,116 and 6,145,010, and are incorporated by reference. In these applications, a trunking arrangement is described where each device is connected to a plurality of trunk switches. The devices are called edge devices and the data to be transferred is divided into packets with destination addresses.

Each trunk switch has a plurality of ports for connecting to all of the edge devices. Packets received on a port are analyzed to determine which port the packet should be sent out on to reach its destination device. Each trunk switch can therefore receive packets from all the edge devices and properly forward the packets to all the edge devices.

An edge device can therefore divide its packets of information among the trunk links and switches. All the packets will then reach the proper destination device, and the data rate will be the sum of the data rate of all the trunk links and switches.

The links connecting each edge device to each trunk switch, and the plurality of trunk switches form a packet based high speed mesh, called a trunk cluster. As described in the copending patent applications, this trunk cluster can be constructed with a set of loosely coupled switches, a configuration protocol, trunk network interfaces and optionally a reachability protocol.

Each switch, called a Trunk Switch, in a trunk cluster, provides a single "shared LAN" by interconnecting two or more links. The attached edge devices connect to a Trunk Cluster via trunked links with either basic trunking or trunking enhanced with station reachability. Basic Trunking requires at least one physical connection to each switch (1 through N) in the Trunk Cluster. As described in application Ser. No. 09/014,548 each switch in the trunk cluster provides a single shared LAN by interconnecting two or more links. The edge devices attached to the links run a trunk configuration protocol. These attached edge devices view each physical link within a trunked port as if the attached device is connected to a shared logical LAN with multiple other attached devices. Each Trunk Switch maintains a list of identifiers that uniquely identify each edge device that is connected to it. The identifier is called the Trunk Port Identifier (TPI). It builds this list up by monitoring the trunk configuration protocol packets that are transmitted by the edge devices. The trunk switch builds TPI to Link map that relates the switch's link identifiers to the TPIs.

A difficulty with these trunk clusters occurs when one of the edge devices loses its connection to one of the trunk switches. In order to maintain the trunking arrangement operational for all edge devices, the trunk switch having the connection problem is effectively removed from the trunk cluster. This allows the trunking arrangement to continue proper operation. However losing this trunk switch causes the bandwidth of the trunk cluster to decrease, which correspondingly lowers the data rate of all the edge devices, due to one edge device losing a link to one trunk switch.

SUMMARY AND OBJECTS OF THE INVENTION

It is a primary object of the present invention to provide a trunking arrangement with a plurality of trunk switches, where a failure of one or more links from an edge device to a trunk switch does not require that the entire trunk switch be removed from the trunking arrangement. The present invention allows the trunk switch to remain in the trunk cluster and to continue forwarding packets of data.

The present invention accomplishes this objective by providing a particular type of trunk switch in the trunk cluster. This trunk switch has a plurality of edge ports for separately connecting to each of the plurality of edge devices by a separate edge link. An address database means is located in the trunk switch for indicating a correspondence of the edge ports to the edge devices. A first or normal switch means in the trunk switch reads the data from each of the edge ports, and consults the address database means to determine which edge port to send the received data out on. The first switch means then transfers the received data to the determined edge port.

The trunk switch of the present invention also includes an intra-cluster port for connecting the individual trunk switches to each other through an intra-cluster link. A second or uni-direct switch means reads intra-cluster data from said intra-cluster port and consults the address database means to determine which edge port to send the intra-cluster data out on. The second switch means then transfers the intra-cluster data to the determined edge port. The trunk switch also has a control means for detecting when an edge device has become disconnected. The control means then modifies the address database means to redirect data for the disconnected edge device to the intra-cluster port for transmission to another trunk switch.

The edge ports and the intra-cluster port transfer the data packets in a substantially identical manner. Also the data packets transferred over the intra-cluster ports and links are transferred at substantially the same data rate as the data packets transferred over the edge ports and edge links.

In particular the first switch means creates a transmit only connection from the first switch means to the intra-cluster port when the control means detects said disconnected edge device. Correspondingly the another trunk switch creates a transmit only connection from the second switch means to the port of an edge device which corresponds to a disconnected edge device of another trunk switch which sent the intra-cluster data.

Since each trunk switch can forward data packets for a disconnected edge device to another trunk switch, and an edge device which is disconnected from one trunk switch can still transmit to another trunk switch, the trunk switch having a disconnected edge device does not need to be removed from the trunking arrangement of the present invention. Therefore while the data rate will be reduced for the edge device which has been disconnected from the trunk switch, the data rates for the remaining edge devices will not be significantly reduced, if reduced at all. The present invention is therefore able to provide a trunking arrangement which is more beneficial in the case of a failure of one of the edge links, and is an improvement in computer networking.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
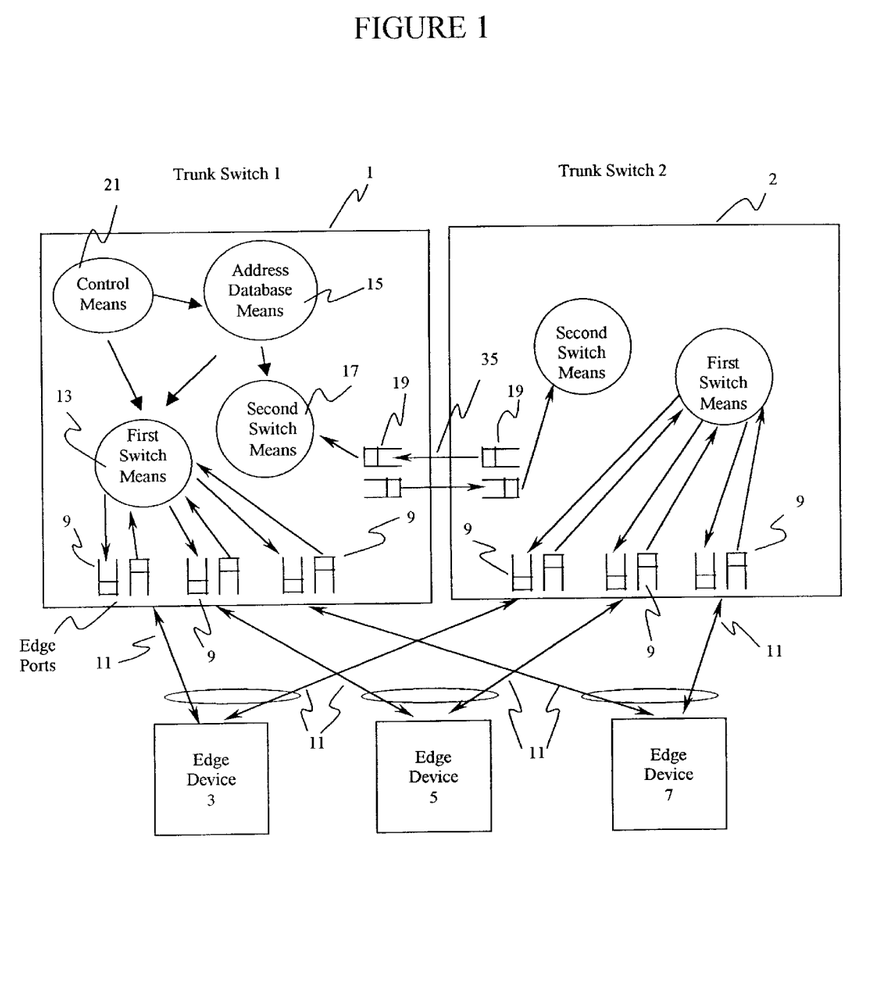
FIG. 1 is a diagram of a trunking arrangement with all the edge devices connected to all of the trunk switches.

Referring to the drawings, in particular to FIG. 1, the trunking arrangement consists of trunk switches 1 and 2, and edge devices 3, 5 and 7. Each trunk switch 1, 2 contains a plurality of edge ports 9 which connect to the edge devices 3, 5 and 7 by edge links 11. Edge ports 9 operate according to IEEE 802.1d standard for MAC clients.

Each trunk switch 1, 2 includes a first switch means which transfers data packets received on one edge port 9 to another edge port 9. The first switch means 13 consults an address database means 15 for determining which other edge port 9 the received data should be sent out on. The second switch means 17 reads data from an intra-cluster port 19. A control means 21 monitors the first switch means 13 and address database means 15. The control means 21 is also able to modify the first switch means 13 and the address database means 15.

Figure 2:
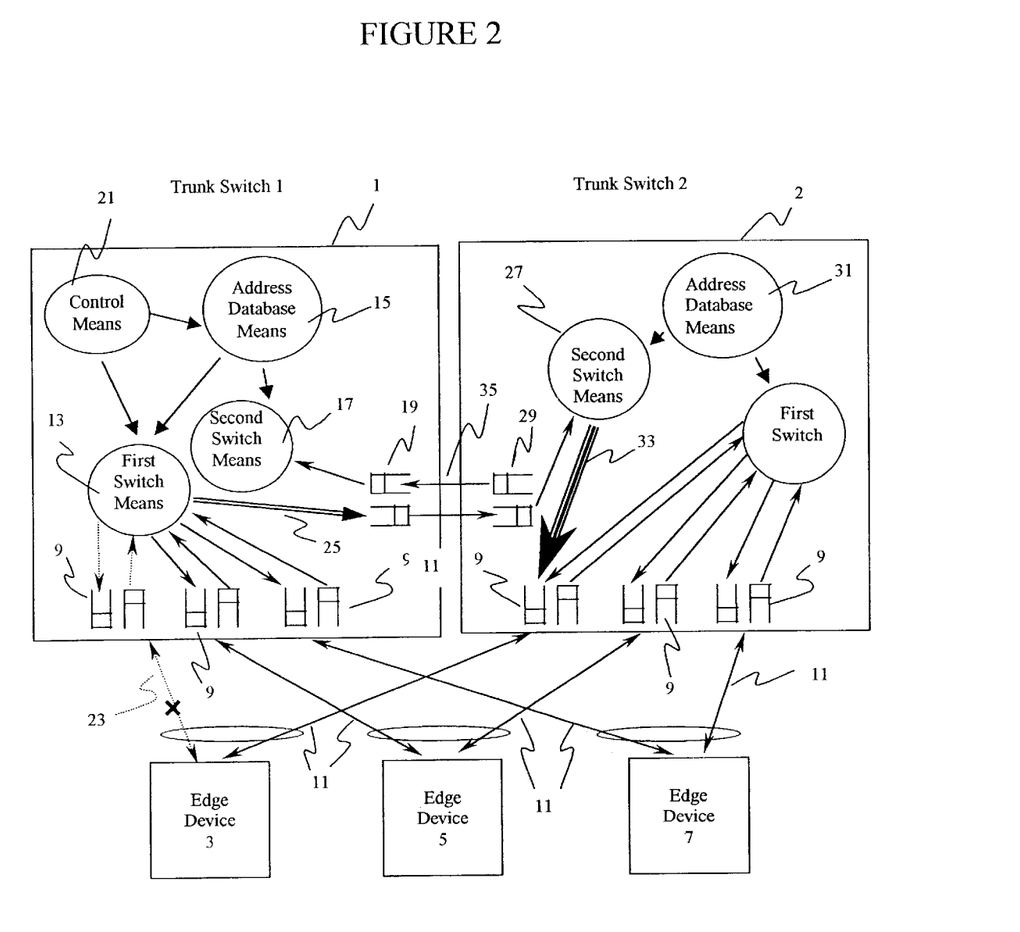
FIG. 2 is a diagram of a trunking arrangement with one of the edge devices disconnected from one of the trunk switches.

An edge device 3 can become disconnected from one of the trunk switches 1, 2 due to many different reasons. As shown in FIG. 2, edge device 3 can become disconnected from trunk switch 1 due to a defective edge link 23. The control means 21 detects from the first switch means 13 that edge device 3 is no longer communicating properly with trunk switch 1. Control means 21 then modifies the address database means 15 so that the first or normal switch means 13 will send packets destned for edge device 13 to intra-cluster port 19 instead of the port connected to the defective edge link 23. The first switch means 13 then creates a transmit only connection (double line arrow) 25 to the intra-cluster port 19. The first trunk switch 1 also communicates to the trunk switch 2 that the link 23 from trunk switch 1 to edge device 3 is non-operational. The second switch means 27 of trunk switch 2 will therefore create a transmit only connection (triple line arrow) 33 from the second switch means 27 to the edge port 9 which connects to the edge device 3.

Second switch means 27 of trunk switch 2 monitors the intra-cluster port 29 of trunk switch 2 and receives the data packets that first switch means 13 sends to intra-cluster port 19 since edge device 3 was disconnected from trunk switch 1. Second switch means 27 consults the address database means 31 to determine which edge port of trunk switch 2 the intra-cluster data-packet should be sent to. Since trunk switch 1 and trunk switch 2 operate according to identical algorithms, and their address databases means 15, 31 are synchronized, both trunk switches will determine that this data-packet is destined for edge device 3. In this way, when trunk switch 1 determines that it cannot deliver a packet, the packet is then sent to trunk switch 2 through the intra-cluster port 19 and intra-cluster link 35 to trunk switch 2. Trunk switch 2 then processes this intra-cluster data packet and forwards the intra-cluster data packet to the proper edge port according to the standard processing of data packets and the transmit only connection 33 which is created when another trunk switch loses a connection.

The operation of the trunk switches is described by the following pseudo code:

If edge device 3 loses its connection to trunk switch 1 and maintains is connection to trunk switch 2 then Trunk switch 1 adds a transmit only connection 25 (double line arrow) from the first switch means 13 to the intra-cluster port 19;

Trunk switch 1 modifies those entries in address data base means 15 which direct packets to the port connected to edge device 3 to direct packets to the intra-cluster port 19;

Trunk switch 2 adds a transmit only connection 33 (triple line arrow) from the second switch means 17 to the edge port 9 connected to edge device 3.

Figure 3:
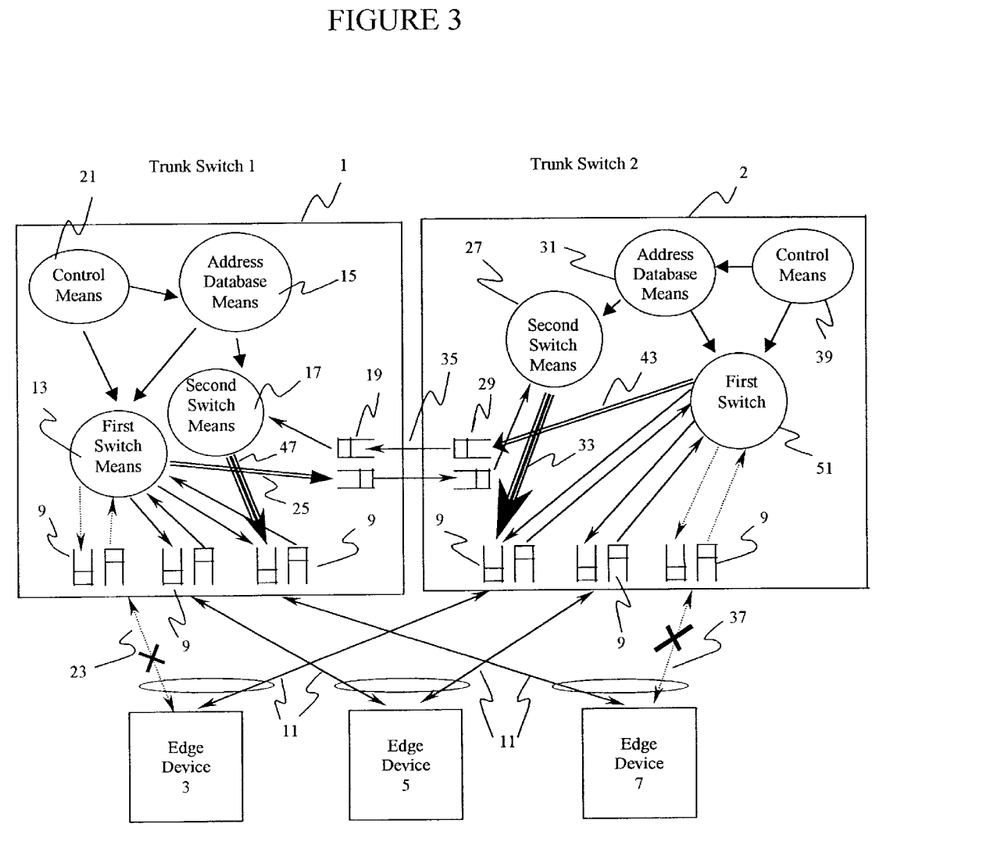
FIG. 3 is a diagram of a trunking arrangement where one of the edge devices is disconnected from one of the trunk switches and another edge device is disconnected from another of the trunk switches.

The trunk cluster of the present invention is also able to adapt to a situation where two separate edge devices 3 and 7 become disconnected from two separate trunk switches 1 and 2. Trunk switch 1 detects the defective edge link 23 as previously described and the first switch means 13 forwards the data for the edge device 3 to intra-cluster port 19 instead of the edge port 9 which corresponds to edge device 3. Trunk switch 2 receives the intra-cluster data over intra-cluster port 29 and the second switch means 27 transfers this intra-cluster data to edge port 9 which corresponds to edge device 3.

Control means 39 of trunk switch 2 detects defective link 37 in the same manner as control means 21 of trunk switch 1 detects defective link 23. First switch means 51 forwards data destined for edge device 7 to intra-cluster port 29 where it is transmitted over intra-cluster link 35 to intra-cluster port 19. There second switch means 17 transfers the intra-cluster data from intra-cluster port 19 to the edge port 9 which corresponds to edge device 7. This is shown in FIG. 3.

In FIG. 3 edge device 3 loses its connection to trunk switch 1 and edge device 7 loses its connection to trunk switch 2. Each switch is running the pseudo code above, both compensate the lost links, and the changes for both errors work in together as described below.

When edge device 3 loses its connection 23 to trunk switch 1 and maintains its connection 11 to trunk switch 2, then; trunk switch 1 adds a transmit only connection (double line arrow) 25 from the first switch means 13 to the intra-cluster port 19. Trunk switch 1 modifies those entries in address data base means 15 which direct packets to the port connected to edge device 3 to direct packets to the intra-cluster port 19, and trunk switch 2 adds a transmit only connection (triple line arrow) 33 from the second switch means 27 to the port 9 connected to edge device 3.

In addition, when edge device 7 loses its connection 37 to trunk switch 2 and maintains its connection 11 to trunk switch 1, then; trunk switch 2 adds a transmit only connection (double line arrow) 43 from the first switch means 51 to the port 29. Trunk switch 2 modifies those entries in address data base means 15 which direct packets to the port connected to edge device 3 to direct packets to the intra-cluster port 29; and trunk switch 1 adds a transmit only connection (triple line arrow) 47 from the second switch 17 to the port 99 connected to edge device 7.

Figure 4:
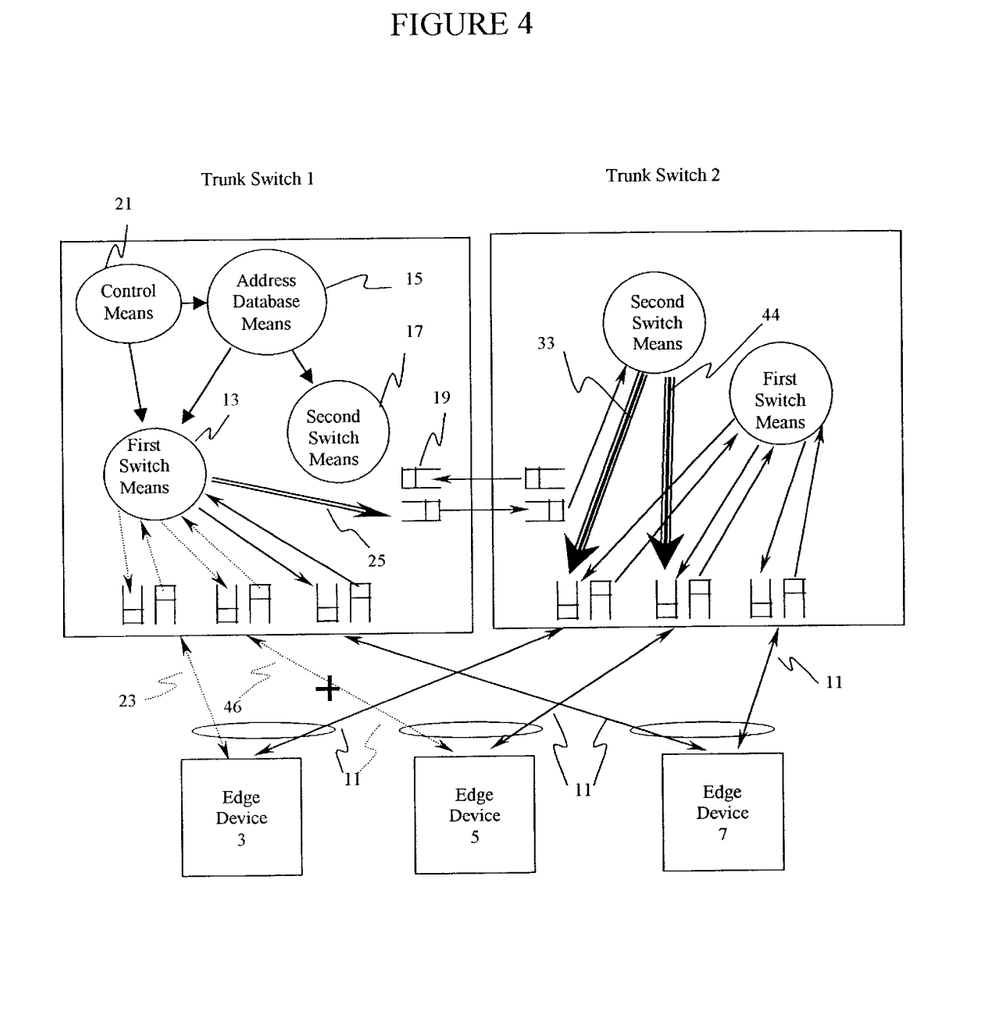
FIG. 4 is a diagram of a trunking arrangement with two of the edge devices disconnected from one of the trunk switches.

Using the pseudo code as previously described, trunk clusters of the present invention are also able to adapt when two or more edge devices have defective links to the same trunk switch. This situation is shown in FIG. 4 where edge device 3 has a defective link 23 to trunk switch 1 and edge device 5 has a defective link 26 to trunk switch 1.

When edge device 3 loses its connection to trunk switch 1 and maintains its connection 11 to trunk switch 2, then trunk switch 1 adds a transmit only connection 25 from the first switch means 13 to the intra cluster port 19 (double line arrow 25). Trunk switch 1 modifies those entries in address data base means 15 which direct packets to the port connected to edge device 3 to direct packets to the intra-cluster port 19. Also as previously described, trunk switch 2 adds a transmit only connection from the second switch means 27 to the edge port 9 connected to the edge device 3 (triple line arrow 33).

In addition if edge device 5 loses its connection 46 to trunk switch 1, and maintains its connection to trunk switch 2, then trunk switch 1 modifies those entries in address data base means 15 which direct packets to the port connected to edge device 3 to direct packets to the intra-cluster port 19. Trunk switch 2 adds a transmit only connection 44 from the second switch means 27 to the edge port 9 connected to the edge device 5 (triple line arrow 44).

In this way, individual trunk switches 1 and 2 of a trunk cluster are able to compensate for lost connections without needing to remove an entire trunk switch from the trunk cluster, and lose its corresponding bandwidth. The intra cluster data transmitted by intra cluster ports 19 and 29 is in addition to trunk synchronization data which is transferred between trunk switches to synchronize the address database and have all the trunk switches operate as a trunk cluster. The intra cluster ports 19 and 29, as well as the intra cluster link 35 is a high speed intra cluster interconnect (HSICI) and preferably operates in a manner substantially similar to the edge ports 9 and the links 22. The speeds of the ports 19 and 29, as well as the intra cluster link 35 is similar to the speeds of the edge ports 9 and the links 22.

Figure 5:
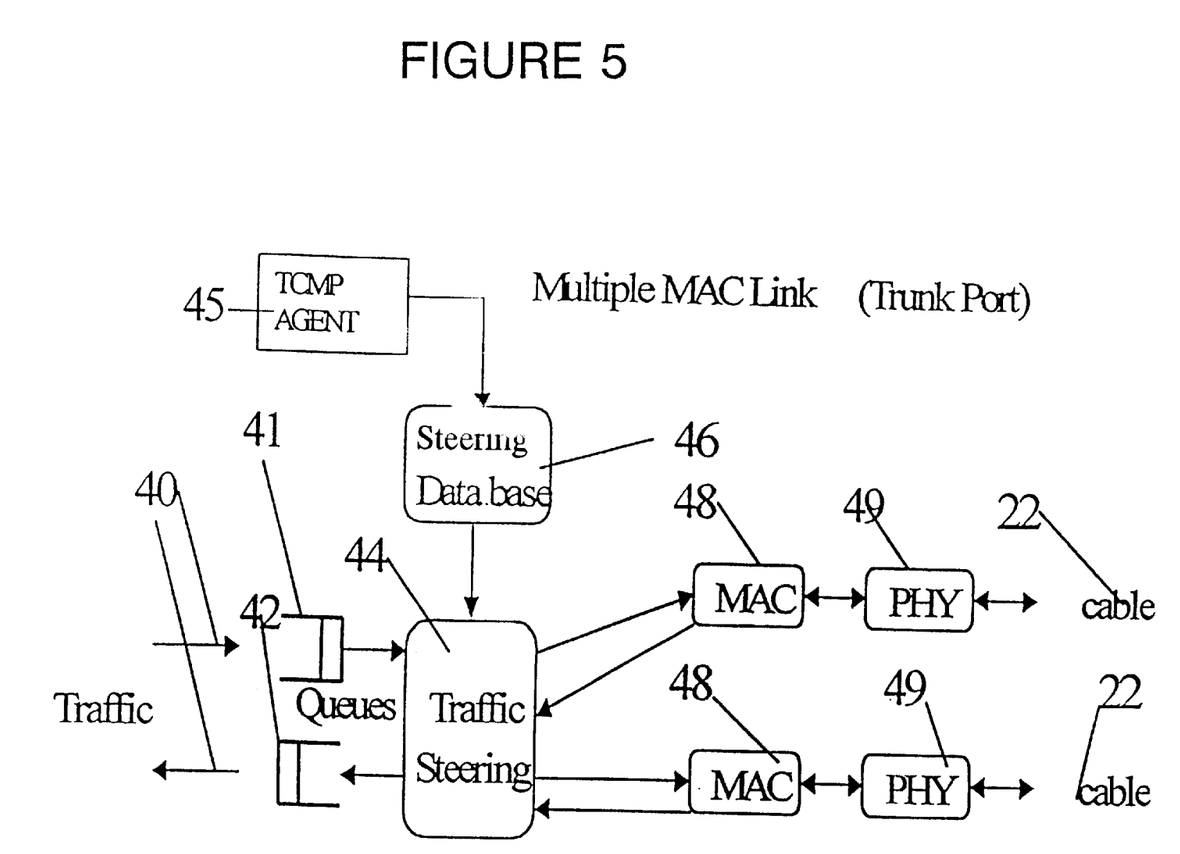
FIG. 5 is a diagram showing traffic flow through a multiple link trunked port.

FIG. 5 illustrates the traffic flow 40 through a multiple link trunked port of an edge device. FIG. 5 shows transmit queue 41, receive queue 42, traffic steering means 44, steering data base 46, media access controllers (MACs) 48, physical layers 49 and connected cable 22 (link 11). The trunked port 9 acts as a single port, but utilizes multiple physical links 22. The traffic steering means is the logic that knows which MAC 48 to use when transmitting a packet. The traffic steering means 44 dequeues transmit packets, examines the packet, consults the steering data base 46 and transfers the packet to the appropriate MAC 48. The steering data base 46 is constructed by information obtained by the reachability protocol or trunk configuration management protocol (TCMP).

Each trunk switch 1, 2 analyzes each received packet for the source address of the packet and the port on which the packet was received. This information is used to update the address data base means of the respective trunk switch, which is then used to update the address data base means of the other trunk switches. In this way, each trunk switch has not only knowledge of the identity of the edge devices, but knowledge of the addresses of further devices connected to the edge devices, such as individual workstations. The relationships of the further devices to the edge devices and to the edge ports, as detected by one trunk switch, is shared with the other trunk switches.

A trunk arrangement can have more than 2 trunk switches. In such an embodiment, at least one of the trunk switches would have more than one intra-cluster port 19. A trunk switch with two intra-cluster ports can connect to two other trunk switches. If a connection to an edge device is lost on a trunk switch with two intra-cluster ports, the trunk switch can send packets for that edge device to either of the two other trunk switches, providing their connections are operational.

Further details regarding operation of each trunk switch 1 and 2 with active links, ports, address data bases and edge devices can be found in Applicant's previously mentioned copending applications which have been incorporated by reference.

While specific embodiments of the invention have been shown and described in detail to illustrate the application of the principles of the invention, it will be understood that the invention may be embodied otherwise without departing from such principles.

What is claimed is:

1. A trunk switch arrangement comprising:
   a plurality of edge devices;
   a first trunk switch, a second trunk switch and a third trunk switch, each of said trunk switches having a plurality of edge ports and an intra-cluster port;
   a trunk link from each of said edge devices to one of said edge ports of each of said trunk switches, said trunk switches cooperating to form a single logical entity receiving data from said edge devices and forwarding data to said edge devices, each edge device being able to communicate with all other edge devices through any one of said trunk switches;

an address data base associated with each of said trunk switches for indicating a correspondence of said edge ports to the edge devices, each trunk switch reading data from each of said respective edge ports, consulting said respective address data base to determine which said respective edge port to send out the received data, and transferring the received data to said determined respective edge port;

a switch control associated with each trunk switch detecting a disconnection of a trunk switch from an edge device and modifying said respective address data base to direct data for said disconnected edge device to said respective intra-cluster port for transmission to another of said trunk switches; and an intra-cluster link for connecting each intra-cluster port of one of said trunk switches to an intra-cluster port of another of said trunk switches and for transferring data between two said intra-cluster ports, each trunk switch reading intra-cluster data from a respective said intra-cluster port, consulting said respective address data base to determine which respective said edge port to send out said intra-cluster data, and transferring said intra-cluster data to said determined respective edge port.

2. A trunk arrangement in accordance with claim 1, wherein each address data base means includes synchronizing means for synchronizing address information with other said trunk switches via said intra-cluster link.

3. A trunk arrangement in accordance with claim 1, wherein said edge ports and said intra-cluster port receive data packets with a destination address and each trunk switch transfers the data packet from one said respective edge port to either another edge port or said intra-cluster port depending upon information present in said destination address and said address data base means, said intra-cluster port receives data packets with a destination address and transfers said data packets from said intra-cluster port to one of said edge ports depending upon information present in said destination address and said address data base means.

4. A trunk arrangement in accordance with claim 1, wherein said edge ports and said intra-cluster port transfer said data at substantially identical speeds.

5. A trunk arrangement in accordance with claim 1, wherein:
each of said trunk switches creates a transmit only connection to said intra-cluster port when said control detects a disconnected edge device and creates a transmit only connection to a disconnected edge device of another trunk switch of the trunk cluster.

6. A trunk arrangement in accordance with claim 1, wherein:
each of said trunk switches includes a second intra-cluster port connecting to another of said trunk switches with each of said trunk switches reading data from said second intra-cluster port, consulting said address data base and sending data out on said intra cluster port or one of said edge ports and said control of each of said trunk switches modifying said associated address data base to redirect data for said disconnected edge device to one of said intra-cluster port and said second intra-cluster port for transmission to another of said trunk switches.

7. A trunk arrangement in accordance with claim 6, wherein each address data base means includes synchronizing means for synchronizing address information with other said trunk switches via said intra-cluster link or via said second intra-cluster link.

8. A trunk arrangement in accordance with claim 1, wherein each address data base provides correspondence between edge ports and addresses of further devices connected to said edge devices.

9. A method of maintaining connectivity of a single logical switching link to edge devices using plural switches, the method comprising the steps of:
providing each of the plural switches with a plurality of edge ports and with a intra-cluster port;
connecting each of the edge devices to a separate edge port of each of the switches to form a single logical switch with each of the trunk switches connected to each edge device;
connecting each intra-cluster port of each of the plural switches with another intra-cluster port of another of the switches;
constructing a steering data base at each of the switches;
transmitting data from each edge device to one of the switches of the single logical switch with the transmitting of data being in a form of a data packet with a destination address;
determining at each trunk switch which of the edge ports and intra-cluster port to send out the received data based on the steering data and the destination address of the data packet;
detecting when an edge device has become disconnected from one of the switches;
updating the steering data bases to change a correspondence between the edge port of the disconnected edge device and the respective switch to include one of the intra-cluster ports for one or more destination addresses.

10. A method according to claim 9, further comprising:
synchronizing a correspondence between respective destination addresses and edge ports and the intra-cluster ports at each of the switches.

11. A method in accordance with claim 9, wherein:
the edge ports and the intra-cluster port transfer the data at substantially identical speeds.

12. A method in accordance with claim 9, further comprising:
providing at least another intra-cluster port on each of the switches;
connecting each of the trunk switches to each other of the switches through one of the intra-cluster ports;
upon detecting when an edge device has become disconnected from one of the switches updating the steering data base to change a correspondence between the edge port of the disconnected edge device and the respective switch to include one of the intra-cluster ports of the respective switch.

13. A method in accordance with claim 9, wherein:
each trunk switch determines correspondence between respective edge ports and source addresses of further devices connected to the edge devices.

14. A switching method for switched data communication between a plurality of different edge devices, the method comprising:
providing a single logical entity with plural switches forming a single logical entity with a plurality of edge ports at each of the switches and a trunk link at each switch providing an individual link from each of the edge ports to a respective different edge device and with an intra-cluster port at each of the switches;

providing a logical entity internal path with an intra-cluster link connecting each intra-cluster port of one of the switches to an intra-cluster port of another of the switches;

providing an address data base for each of the switches for indicating a correspondence of edge ports to the edge devices or for indicating a correspondence of the intra-cluster ports to one or more edge devices upon one or more of the edge devices becoming disconnected from a respective switch;

transferring data between edge devices via the single logical entity including each of the switches reading data from data packets received at each of the respective edge ports and intra-cluster ports and consulting the respective address data base to determine which respective edge port or intra-cluster port to send out the received data, and transferring the received data to the determined respective edge port or intra-cluster port including transferring data based on the correspondence of the edge ports to edge devices until detecting at the single logical entity a disconnection between an edge device and a switch edge port and modifying the respective address data base to direct data for the disconnected edge device based on correspondence of the intra-cluster port to the disconnected edge device.

15. A switching method according to claim 14, further comprising:

sending modifying data to each respective address data base of each other switch, via the intra cluster link to synchronize each address data base of each of the switches of the single logical entity.

16. A method in accordance with claim 14, wherein:

the edge ports and the intra-cluster port transfer the data at substantially identical speeds.

17. A method in accordance with claim 14, further comprising:

providing at least another intra-cluster port on each of the switches;

connecting each of the trunk switches to each other of the switches through one of the intra-cluster ports;

upon detecting when an edge device has become disconnected from one of the switches updating the steering data base to change a correspondence between the edge port of the disconnected edge device and the respective switch to include one of the intra-cluster ports of the respective switch.

18. A method in accordance with claim 14, wherein:

each trunk switch determines correspondence between respective edge ports and source addresses of further devices connected to the edge devices.

* * * * *